Sept. 5, 1933.    R. W. ALEXANDER    1,925,741
TROLLEY AND THE LIKE FOR CONDUCTING ELECTRIC CURRENT
FROM CABLES TO THE MOTORS OF VEHICLES
Filed Aug. 26, 1931

Witness:
Arthur Thompson

Inventor:
Robert Wotherspoon Alexander

Patented Sept. 5, 1933

1,925,741

UNITED STATES PATENT OFFICE 1,925,741

TROLLEY AND THE LIKE FOR CONDUCTING ELECTRIC CURRENT FROM CABLES TO THE MOTORS OF VEHICLES

Robert Wotherspoon Alexander, Johannesburg, Transvaal, Union of South Africa

Application August 26, 1931, Serial No. 559,474, and in the Union of South Africa September 3, 1930

3 Claims. (Cl. 191—60)

This invention relates to trolleys and similar devices which are employed for conducting electric current from cables or wires to the conductors or cables which lead the current to the motors of tramcars and other road and railway vehicles. It is equally applicable to the trolleys of vehicles which traverse tracks, rails or permanent ways, and to "trackless" vehicles.

With trolleys as at present constructed difficulty arises from the fact that, when the trolley pulley is passing over the points of connection of the cable to the suspension means, the pulley disengages or leaves the cable for variable distances or periods of time. This causes damage to both the trolley pulley and cable, chiefly by burning due to arcing.

Another difficulty due to the existing construction is the liability of the trolley pulley to disengage the cable and, by coming into contact with the wires which carry or support the cable, while the vehicle continues to travel, cause often extensive damage to the cable supporting means.

The invention consists essentially in interposing spring means in a convenient position intermediate the trolley pulley and the trolley pole, so that said spring means operates to move the pulley upwards in relation to that end of the trolley pole to which it is attached, and thereby ensures continuous or practically continuous contact between the trolley pulley and the cable.

In one and the preferred form of the invention, the holder for the trolley pulley is carried by the bracket which is fixed upon the upper end of the trolley pole, the pulley holder being so constructed that it can move upwards and downwards in its supporting bracket, as well as swivel therein, and spring means is provided which operates to move the trolley pulley holder upwards relative to the supporting bracket, so as to ensure continuous or practically continuous contact between the pulley and the cable.

The invention will be explained with the aid of the accompanying sheet of drawing, in which a practical embodiment of the same is illustrated, wherein Fig. 1 is a side elevation of a trolley incorporating the invention.

Figures 1, 2:
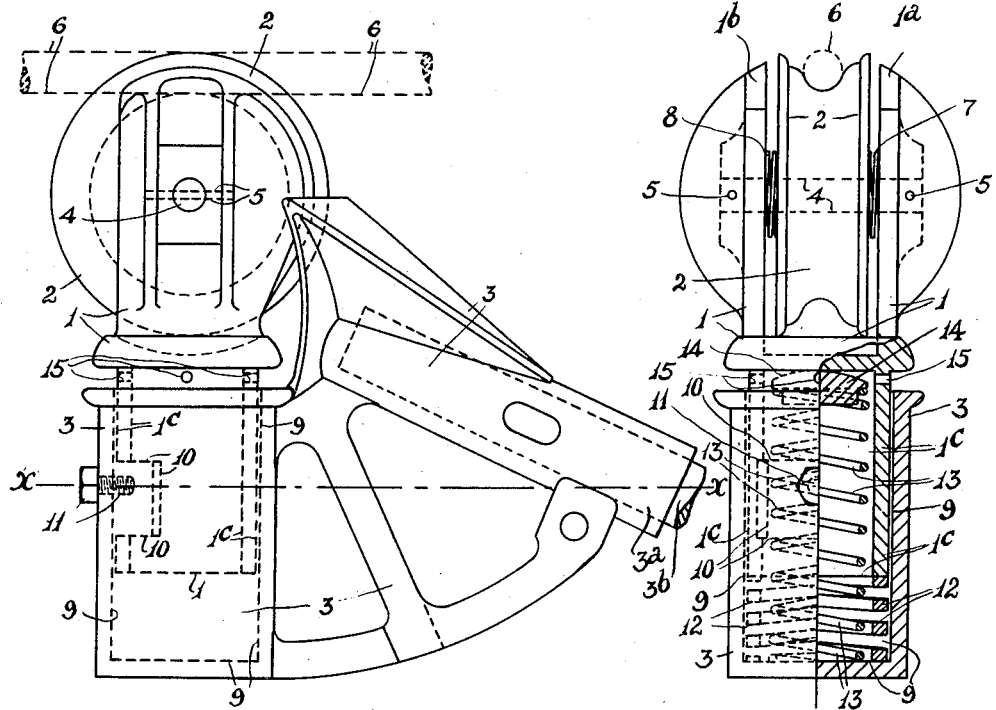
Fig. 2 is a part-sectional end elevation of Fig. 1.
Figure 3:
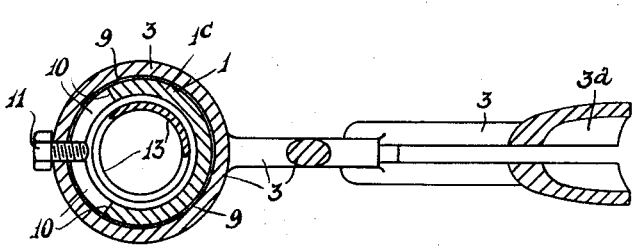
Fig. 3 is a sectional plan of Fig. 1, on line x—x.

In the drawing 1 denotes the trolley pulley holder, or that part of the device which at its upper end, between the cheeks 1a, 1b, rotatably supports the grooved pulley 2, and at its lower end 1c is mounted in the trolley bracket 3, in which it is adapted to swivel or rotate, and move up and down, within certain limits. 3a is the socket portion of the bracket 3 in which the upper end 3b of the trolley pole fits and to which it is secured. 4 is the pulley spindle on which the pulley 2 is rotatably mounted, and 5 transverse pins which serve for fixing the spindle 4 in the cheeks 1a, 1b, on the upper portion of the holder 1.

The pulley 2 is shown of the ordinary peripherally grooved type for running in contact with the cable or conductor, shown in dotted lines at 6. 7, 8, are helical springs arranged around the spindle 4 between the sides of the pulley 2 and the adjacent inner surfaces of the cheeks 1a, 1b, of the pulley holder 1.

The bracket 3 to which the pulley holder 1 is swivelled, or in which it is rotatably mounted, is constructed, as usual, to form a housing 9 for, or to receive, the cylindrical lower portion 1c of the pulley holder 1. For the purpose of retaining the holder 1 in position and limiting the extent of its rotary and up and down movement in the housing 9 provided by the bracket 3, a slot 10 is provided in the cylindrical lower portion 1c of the pulley holder 1, and a set-screw 11 is screwed through the housing 9 into the slot 10, so that it will engage with the sides of the slot 10 to limit the rotary movement of the pulley holder 1, and with the top and bottom of the slot 10 to limit its upward and downward movement.

In the bottom of the recess provided by the housing 9 in the bracket 3, a suitable strong helical cushioning spring 12 is arranged with which the bottom end of the lower portion 1c of the pulley holder 1 engages when the pulley 2 is in running engagement with the cable 6.

Partially within and extending above said latter spring 12 is arranged a lighter helical spring 13 of smaller diameter. This lighter spring 13 rests on the bottom of the housing 9 and projects up into the interior of the hollow cylindrical portion 1c of the holder 1, and at its upper end engages with a piece or pad 14 having a convex upper surface which contacts with the upper inner end of the cylindrical portion 1c of the holder 1, and at its other end is reduced to fit into the upper end of the spring 13. 15 are holes provided in the upper end of the lower portion 1c of the pulley holder 1 to allow of the egress and ingress of air from and into the interior of the hollow cylindrical portion 1c, as the latter moves up and down in its housing 9.

In the operation of the device, in the event of any tendency for the trolley pulley 2 to leave the cable 6, the spring 13 acts quickly to ensure continuous or practically continuous contact between the pulley 2 and cable 6, while the heavier spring 12 acts as a cushion between the holder 1 and its bracket 3 and so operates as a buffer between the trolley pole 3b and the cable 6.

What I claim as my invention and desire to protect by Letters Patent is:—

1. A device of the nature indicated, including, in combination, a trolley pulley, a holder in which said pulley is rotatably mounted, said holder having a hollow lower portion, a hollow bracket in which the hollow lower portion of the holder is arranged in such a way that it can move upwards and downwards as well as rotate, a trolley pole to which the bracket is fixed, relatively light spring means housed within the hollow portions of the holder and bracket between the bottom of the housing in the bracket and the inner end of the hollow portion of the holder, and heavier cushioning spring means interposed between the lower end of the holder and the bottom of the housing in the bracket, which acts as a buffer between the pulley holder and bracket, as set forth.

2. A device of the nature indicated, including, in combination, a trolley pulley, a holder in which said pulley is rotatably mounted, said holder having a hollow lower portion, a hollow bracket in which the hollow lower portion of the holder is arranged in such a way that it can move upwards and downwards as well as rotate, a trolley pole to which the bracket is fixed, relatively light spring means housed within the hollow portions of the holder and bracket between the bottom of the housing in the bracket and the inner end of the hollow portion of the holder, and heavier cushioning spring means interposed between the lower end of the holder and the bottom of the housing in the bracket, which acts as a buffer between the pulley holder and bracket, the bracket and holder being provided the one with a stop and the other with a slot in which the stop engages to limit both the up and down and rotary movements of the holder relative to the bracket, as set forth.

3. A device of the nature indicated, including, in combination, a trolley pulley, a holder in which said pulley is rotatably mounted, a bracket carrying the holder in such a way that it can move upwards and downwards as well as rotate, a trolley pole to which the bracket is fixed, relatively light spring means arranged between and co-operating with the holder and bracket, and heavier cushioning spring means arranged between and co-operating with said holder and bracket, the relatively light spring means operating independently of the heavier spring means to keep the trolley pulley in contact with the cable, and the heavier cushioning spring means acting after the light spring means has been partially compressed, as set forth.

ROBERT WOTHERSPOON ALEXANDER.